United States Patent
Fuller et al.

(10) Patent No.: US 9,512,936 B2
(45) Date of Patent: Dec. 6, 2016

(54) THREE-PORT MICROVALVE WITH IMPROVED SEALING MECHANISM

(71) Applicant: DunAn Microstaq, Inc., Austin, TX (US)

(72) Inventors: Edward Nelson Fuller, Manchester, MI (US); Parthiban Arunasalam, Austin, TX (US); Chen Yang, Austin, TX (US); Joe A. Ojeda, Sr., Austin, TX (US); Gengxun K. Gurley, Hutto, TX (US)

(73) Assignee: DunAn Microstaq, Inc., Austin, TX (US)

( * ) Notice: Subject to any disclaimer, the term of this patent is extended or adjusted under 35 U.S.C. 154(b) by 12 days.

(21) Appl. No.: 14/743,078

(22) Filed: Jun. 18, 2015

(65) Prior Publication Data

US 2016/0047491 A1    Feb. 18, 2016

Related U.S. Application Data

(60) Provisional application No. 62/037,328, filed on Aug. 14, 2014.

(51) Int. Cl.
*F16K 3/00* (2006.01)
*F16K 99/00* (2006.01)

(52) U.S. Cl.
CPC ....... *F16K 99/0028* (2013.01); *F16K 99/0011* (2013.01); *F16K 99/0059* (2013.01)

(58) Field of Classification Search
None
See application file for complete search history.

(56) References Cited

U.S. PATENT DOCUMENTS

| | | | |
|---|---|---|---|
| 6,736,370 B1 * | 5/2004 | Crockett | F16K 27/003 251/129.17 |
| 7,849,874 B2 * | 12/2010 | Kuwata | F16K 11/0655 137/375 |
| 8,113,482 B2 * | 2/2012 | Hunnicutt | F16K 99/0001 137/625.25 |
| 8,136,616 B2 | 3/2012 | Padilla et al. | |

(Continued)

*Primary Examiner* — John Fox
(74) *Attorney, Agent, or Firm* — MacMillan, Sobanski & Todd, LLC (57) ABSTRACT

A microvalve includes a first plate having an inner surface, a recessed region provided within the inner surface, a normally open fluid port and a normally closed fluid port provided within the recessed region. A first sealing structure extends about the normally open fluid port, and a second sealing structure extends about the normally closed fluid port. A second plate defines a non-movable portion and a movable portion. A surface of the non-movable portion abuts the inner surface of the first plate, the non-movable portion having an opening formed therethrough. The movable portion is formed within the opening, has an axis, and defines a displaceable member connected to the non-movable portion by a convoluted spring formed in the opening. The displaceable member is slidingly and axially movable within the opening between a first position, wherein the displaceable member cooperates with the second sealing structure to prevent fluid communication through the normally closed fluid port, and a second position, wherein the displaceable member does not cooperate with at least a portion of the second sealing structure to prevent fluid communication through the normally closed fluid port.

20 Claims, 9 Drawing Sheets

(56) References Cited

U.S. PATENT DOCUMENTS

| | | |
|---|---|---|
| 8,662,468 B2 | 3/2014 | Hunnicutt |
| 9,140,613 B2 | 9/2015 | Arunasalam et al. |
| 2014/0374633 A1 | 12/2014 | Fuller et al. |
| 2015/0047345 A1 | 2/2015 | Eves et al. |
| 2015/0352604 A1 | 12/2015 | Arunasalam et al. |

\* cited by examiner

THREE-PORT MICROVALVE WITH IMPROVED SEALING MECHANISM

CROSS REFERENCE TO RELATED APPLICATIONS

This application claims the benefit of U.S. Provisional Application No. 62/037,328 filed Aug. 14, 2014, the disclosure of which is incorporated herein by reference.

BACKGROUND OF THE INVENTION

This invention relates in general to microvalves for controlling the flow of fluid through a fluid circuit. In particular, this invention relates to an improved structure for a three-port plate microvalve that resists interference with the free movement of a displaceable member of the plate microvalve that might otherwise result from the presence of particulate contaminants contained in the fluid flowing therethrough.

Generally speaking, a micro-electro-mechanical system is a system that not only includes both electrical and mechanical components, but is additionally physically small, typically including features having sizes in the range of ten micrometers or smaller. The term "micro-machining" is commonly understood to relate to the production of three-dimensional structures and moving parts of such micro-electro-mechanical system devices. In the past, micro-electro-mechanical systems used modified integrated circuit (e.g., computer chip) fabrication techniques (such as chemical etching) and materials (such as silicon semiconductor material), which were micro-machined to provide these very small electrical and mechanical components. More recently, however, other micro-machining techniques and materials have become available.

As used herein, the term "micro-machined device" means a device including features having sizes in the micrometer range or smaller and, thus, is at least partially formed by micro-machining. As also used herein, the term "microvalve" means a valve including features having sizes in the micrometer range or smaller and, thus, is also at least partially formed by micro-machining. Lastly, as used herein, the term "microvalve device" means a micro-machined device that includes not only a microvalve, but further includes additional components. It should be noted that if components other than a microvalve are included in the microvalve device, these other components may be either micro-machined components or standard-sized (i.e., larger) components. Similarly, a micro-machined device may include both micro-machined components and standard-sized components.

A variety of microvalve structures are known in the art for controlling the flow of fluid through a fluid circuit. One well known microvalve structure includes a displaceable member that is supported within a closed internal cavity provided in a valve body for pivoting, axial, or other movement between a closed position and an opened position. When disposed in the closed position, the displaceable member substantially blocks a first fluid port that is otherwise in fluid communication with a second fluid port, thereby preventing fluid from flowing between the first and second fluid ports. When disposed in the opened position, the displaceable member does not substantially block the first fluid port from fluid communication with the second fluid port, thereby permitting fluid to flow between the first and second fluid ports.

In this conventional microvalve structure, the thickness of the closed internal cavity is usually only slightly larger than the thickness of the displaceable member disposed therein. Thus, relatively small spaces are provided between the displaceable member and the adjacent portions of the microvalve that define the closed internal cavity. This is done so as to minimize the amount of undesirable leakage therethrough when the displaceable member is disposed in the closed position. However, it has been found that when this conventional microvalve structure is used to control the flow of fluid containing solid particles (such as particulate contaminants that may be contained within the fluid), such particles may become jammed between the displaceable member and the adjacent portions of the microvalve that define the closed internal cavity. The jamming of such particles can, in some instances, undesirably interfere with the free movement of the displaceable member between the closed and opened positions. Thus, it would be desirable to provide an improved structure for a microvalve that resists interference with the free movement of a displaceable member of the microvalve that might otherwise result from the presence of particulate contaminants contained in the fluid flowing therethrough.

SUMMARY OF THE INVENTION

This invention relates to an improved structure for a microvalve that resists interference with the free movement of a displaceable member of the microvalve that might otherwise result from the presence of particulate contaminants contained in the fluid flowing therethrough. The microvalve includes a first plate having an inner surface, a recessed region provided within the inner surface, a normally open fluid port and a normally closed fluid port provided within the recessed region. A first sealing structure extends about the normally open fluid port, and a second sealing structure extends about the normally closed fluid port. A second plate defines a non-movable portion and a movable portion. A surface of the non-movable portion abuts the inner surface of the first plate, the non-movable portion having an opening formed therethrough. The movable portion is formed within the opening, has an axis, and defines a displaceable member connected to the non-movable portion by a convoluted spring formed in the opening. The displaceable member is slidingly and axially movable within the opening between a first position, wherein the displaceable member cooperates with the second sealing structure to prevent fluid communication through the normally closed fluid port, and a second position, wherein the displaceable member does not cooperate with at least a portion of the second sealing structure to prevent fluid communication through the normally closed fluid port.

Other advantages of this invention will become apparent to those skilled in the art from the following detailed description of the invention, when read in light of the accompanying drawings.

DETAILED DESCRIPTION OF THE INVENTION

Figure 1:
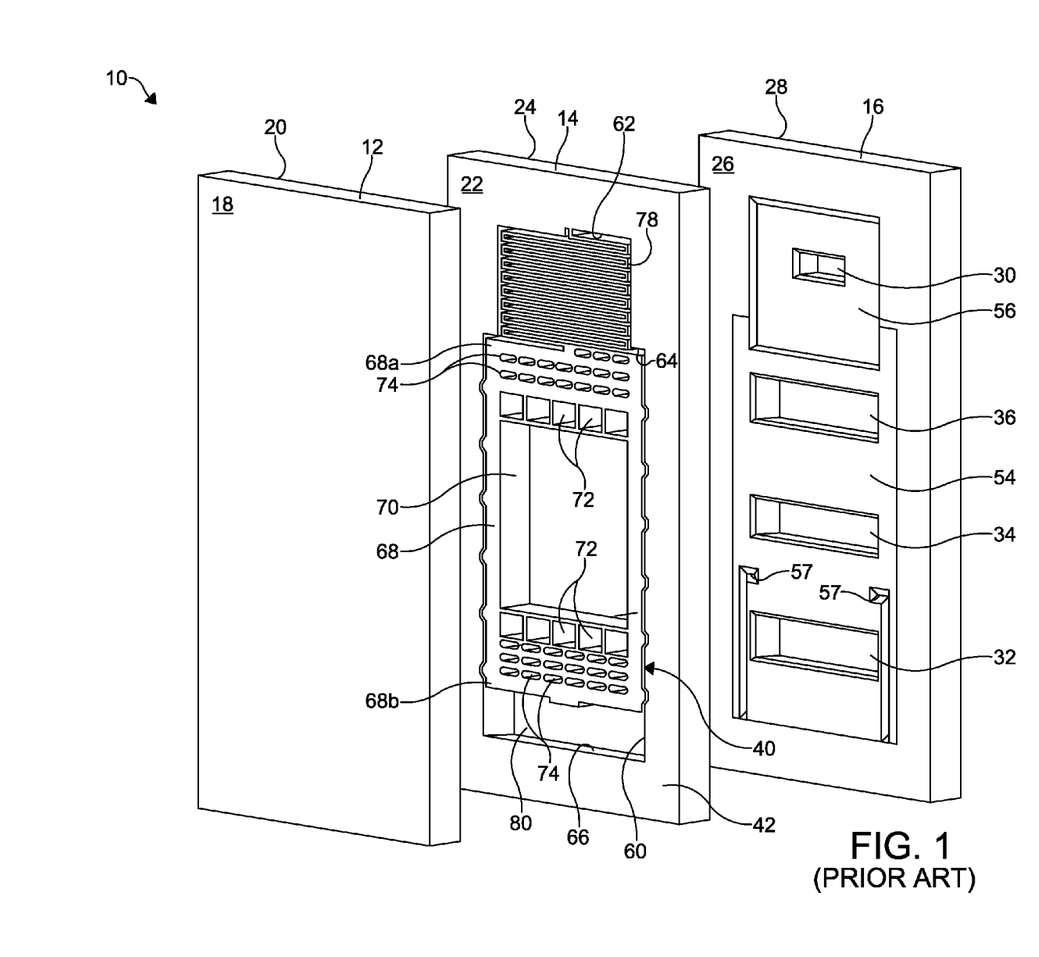
FIG. 1 is an exploded perspective view of a known pilot operated three-port plate microvalve.
Figure 2:
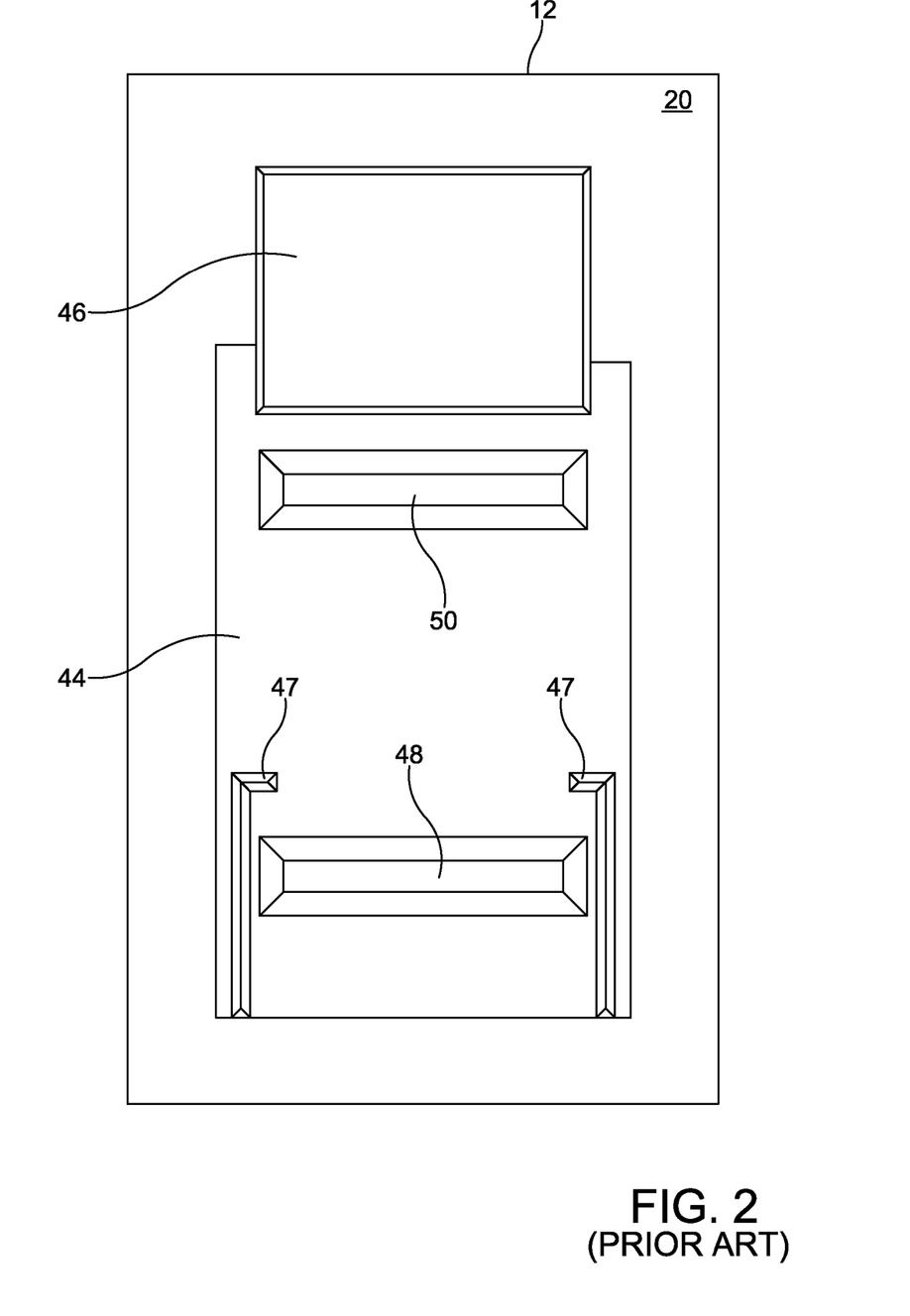
FIG. 2 is a plan view of an inner surface of the cover plate illustrated in FIG. 1.
Figure 3:
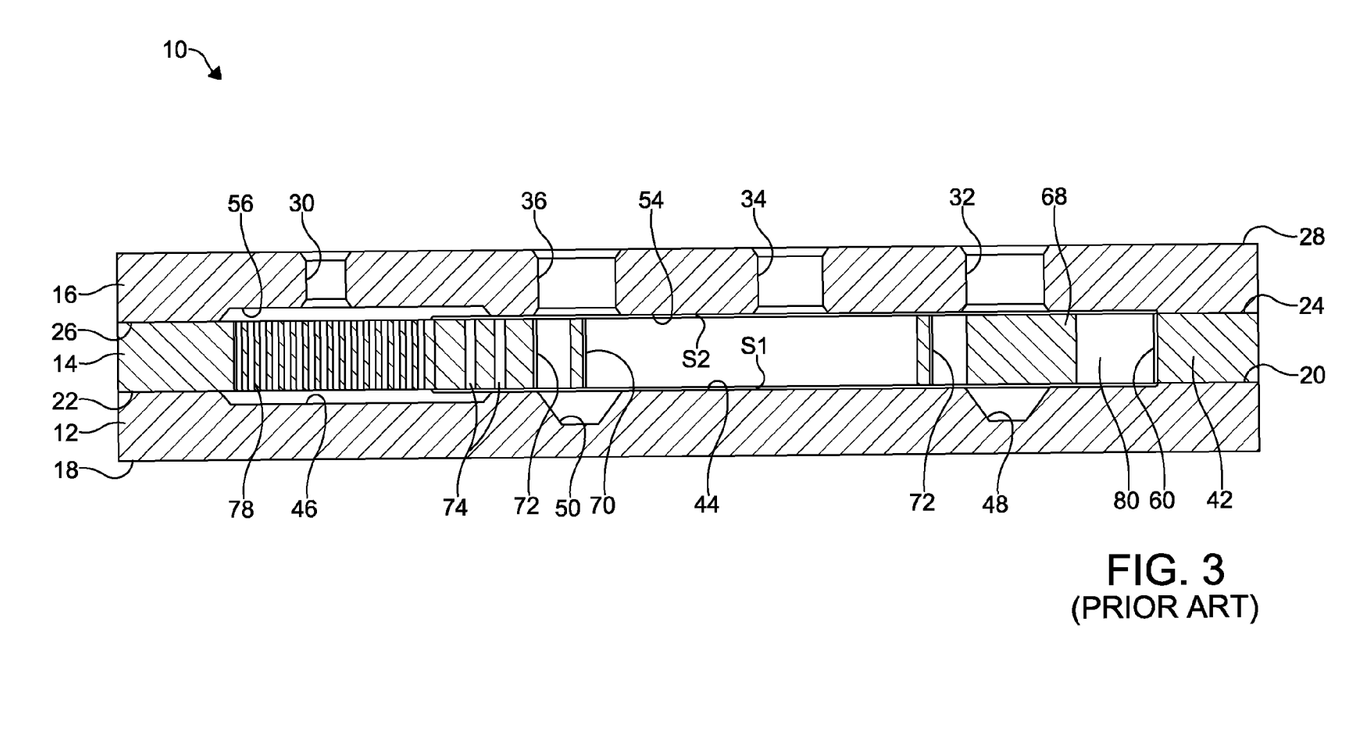
FIG. 3 is a sectional elevational view of the microvalve illustrated in FIG. 1 shown assembled.

Referring now to the drawings, an embodiment of a known microvalve is indicated generally at 10 in FIGS. 1 through 3. The illustrated microvalve 10 is a pilot operated pressure control three-port plate microvalve, similar to the embodiments of the microvalve disclosed in U.S. Pat. No. 8,113,482 to Hunnicutt, the disclosure of which in incorporated herein in its entirety.

As shown in FIG. 1, the microvalve 10 includes a cover plate 12, an intermediate plate 14, and a base plate 16. The cover plate 12 has an outer surface 18 and an inner surface 20. The intermediate plate 14 has a first surface 22 and a second surface 24 and defines a movable portion 40 and a non-movable portion 42. The base plate 16 has an inner surface 26 and an outer surface 28. The base plate 16 also has a control port 30, a first fluid port 32, a second fluid port 34, and a third fluid 36 formed therethrough.

When the microvalve 10 is assembled as shown in FIG. 3, the inner surface 20 of the cover plate 12 engages the first surface 22 of the non-movable portion 42 of the intermediate plate 14, and the inner surface 26 of the base plate 16 engages the second surface 24 of the non-movable portion 42 of the intermediate plate 14. The cover plate 12, the intermediate plate 14, and the base plate 16 may be retained in this orientation in any desired manner.

The structure of the inner surface 20 of the cover plate 12 is illustrated in FIG. 2. As shown therein, the cover plate 12 includes a first recessed region 44, a second recessed region 46, and two pressure balance trenches 47 formed in the first recessed region 44. First and second pressure equalization troughs, 48 and 50, respectively, are also formed the inner surface 20 within the first recessed region 44.

The structure of the inner surface 26 of the base plate 16 is illustrated in FIG. 1. As shown therein, the base plate 16 includes a first recessed region 54, a second recessed region 56, and two pressure balance trenches 57 formed in the first recessed region 54. The first fluid port 32, the second fluid port 34, and the third fluid 36 are formed the inner surface 26 within the first recessed region 54. The control port 30 is formed the inner surface 26 within the second recessed region 56.

The structure of the intermediate plate 14 is illustrated in detail in FIG. 1. As shown therein, a wide and preferably rectangular plate opening 60, and an adjacent and also preferably rectangular spring opening 62 are formed in the intermediate plate 14. The spring opening 62 is preferably narrower than the plate opening 60. The plate opening 60 and the spring opening 62 are in fluid communication with each other.

The plate opening 60 has a first end 64 which is adjacent and in fluid communication with the spring opening 62. The plate opening 60 also has a second end 66 opposite the first end 64.

The intermediate plate 14 further includes a displaceable member or plate 68 disposed in the plate opening 60 between the first and second ends 64 and 66 of the plate opening 60. The displaceable plate 68 is movable between a first position (not shown) adjacent the second end 66 of the plate opening 60, and a second position, as shown in FIG. 1, adjacent the first end 64 of the plate opening 60.

The displaceable plate 68 is generally rectangular and has a first end 68a disposed nearest the first end 64 of the plate opening 60. The displaceable plate 68 has a second end 68b disposed nearest the second end 66 of the plate opening 60.

The displaceable plate 68 has a first fluid opening 70 and plurality of second fluid openings 72 formed therethrough. Pressure balancing ports 74 are also formed through the displaceable plate 68.

The intermediate plate 14 also includes a convoluted spring 78, disposed in the spring opening 62. The convoluted spring 78 moveably connects the non-movable portion 42 of the intermediate plate 14 to the displaceable plate 68, and preferably biases the displaceable plate 68 to the first position. The convoluted spring 78 also retains the displaceable plate 68 in the plate opening 60.

A variable volume area 80 is defined below the second end 68b of the displaceable plate 68 between the first recessed region 44 and the first recessed region 54. The pressure balance trenches 47 and 57 provide fluid communication between the second fluid port 34 and the variable volume area 80.

As best shown in FIG. 3, a first relatively small space S1 is defined between the first recessed region 44 provided on the inner surface 20 of the cover plate 12 and the adjacent first surface 22 (the lower surface when viewing FIG. 3) of the displaceable plate 68. The thickness of this first relatively small space S1 has traditionally been about 3 μm in order to prevent excessive leakage through the microvalve 10.

Similarly, a second relatively small space S2 is defined between the first recessed region 54 provided on the inner surface 26 of the base plate 16 and the adjacent second surface 24 (the upper surface when viewing FIG. 1) of the displaceable plate 68. The thickness of this second relatively small space S2 has traditionally been about 3 μm in order to prevent excessive leakage through the microvalve 1.

In order to minimize leaking through the conventional microvalve 10 illustrated in FIGS. 1 through 3, it is desirable that the thicknesses of the relatively small spaces S1 and S2 be as small as possible. However, because the thicknesses of these relatively small spaces S1 and S2 are not only relatively small, but are constant throughout the entire surface area of the displaceable plate 68, then the likelihood increases that one or more particles (not shown) contained in the fluid leaking through such relatively small spaces S1 and S2 may become jammed therebetween. In other words, the particles may become jammed between either (1) the first recessed region 44 provided on the inner surface 20 of the cover plate 12 and the adjacent first surface 22 of the displaceable plate 68, or (2) the first recessed region 54 provided on the inner surface 26 of the base plate 16 and the adjacent second surface 24 of the displaceable plate 68.

FIGS. 4 through 10 illustrate portions of an improved microvalve, indicated generally at 100, in accordance with a first embodiment of this invention that minimizes the likelihood of such undesirable jamming. The illustrated microvalve 100 is a pilot operated pressure control three-port plate microvalve that includes improved sealing structures, described in detail below.

Figure 4:
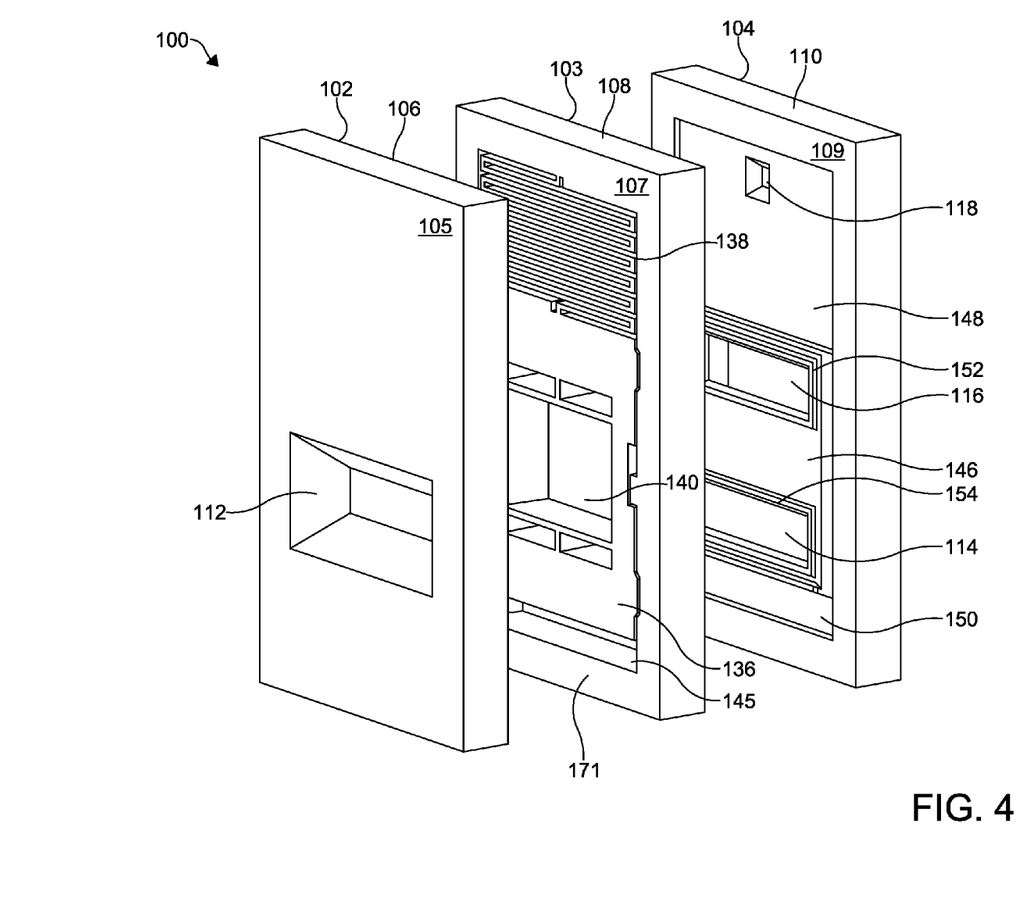
FIG. 4 is an exploded perspective view of an improved pilot operated three-port plate microvalve in accordance with this invention.

As shown in FIG. 4, the microvalve 100 includes a cover plate 102, an intermediate plate 103, and a port or base plate 104. The cover plate 102 has an outer surface 105 and an inner surface 106. The cover plate 102 also has a common port 112 formed therethrough. The intermediate plate 103 has a first surface 107 and a second surface 108. The base plate 104 has an inner surface 109 and an outer surface 110. The base plate 104 also has a normally closed valve port 114, a normally open valve port 116, and a control port 118 formed therethrough.

Figure 9:
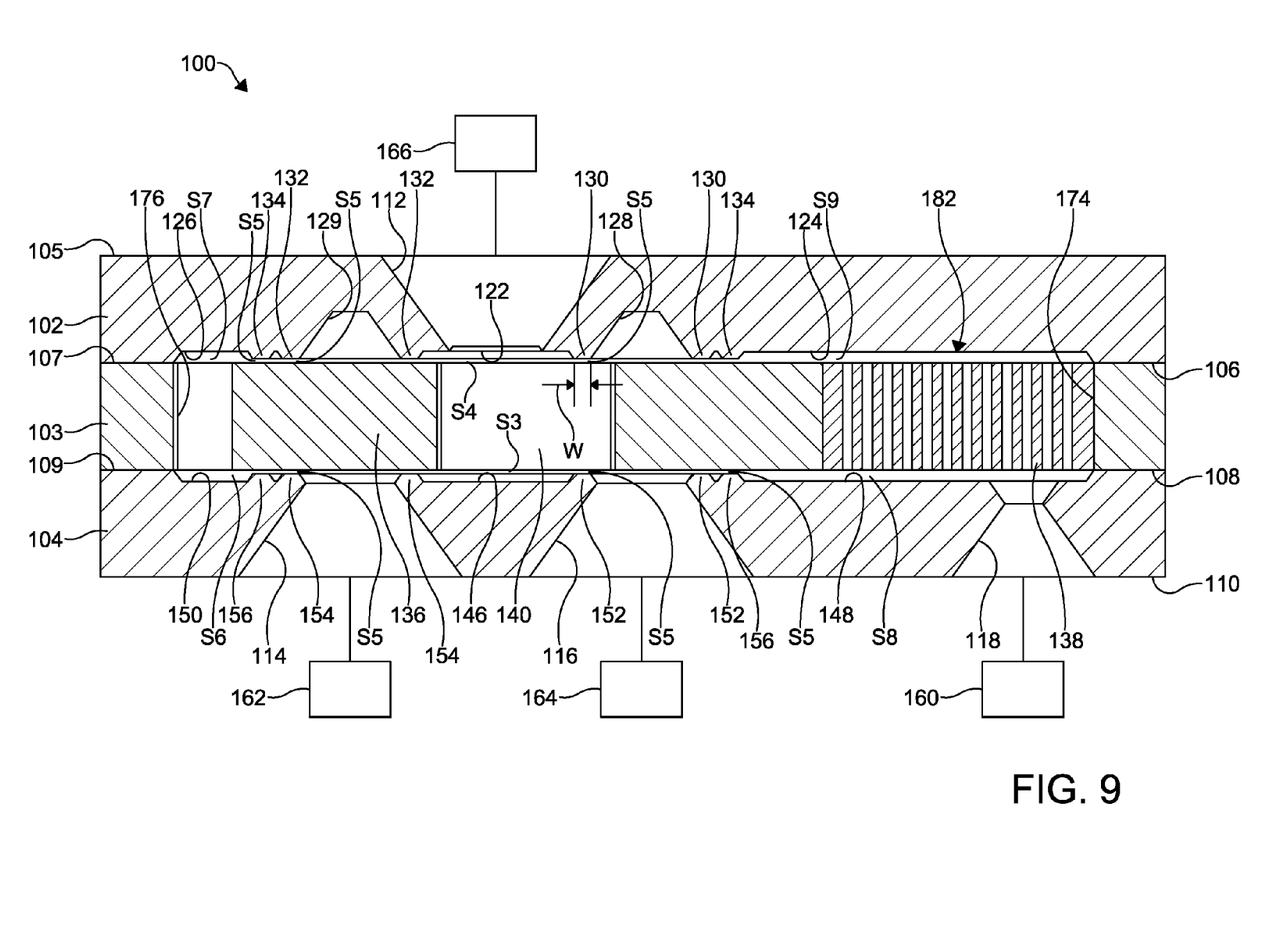
FIG. 9 is a sectional elevational view of the microvalve illustrated in FIG. 4 shown assembled and showing the intermediate plate in the first position.
Figure 10:
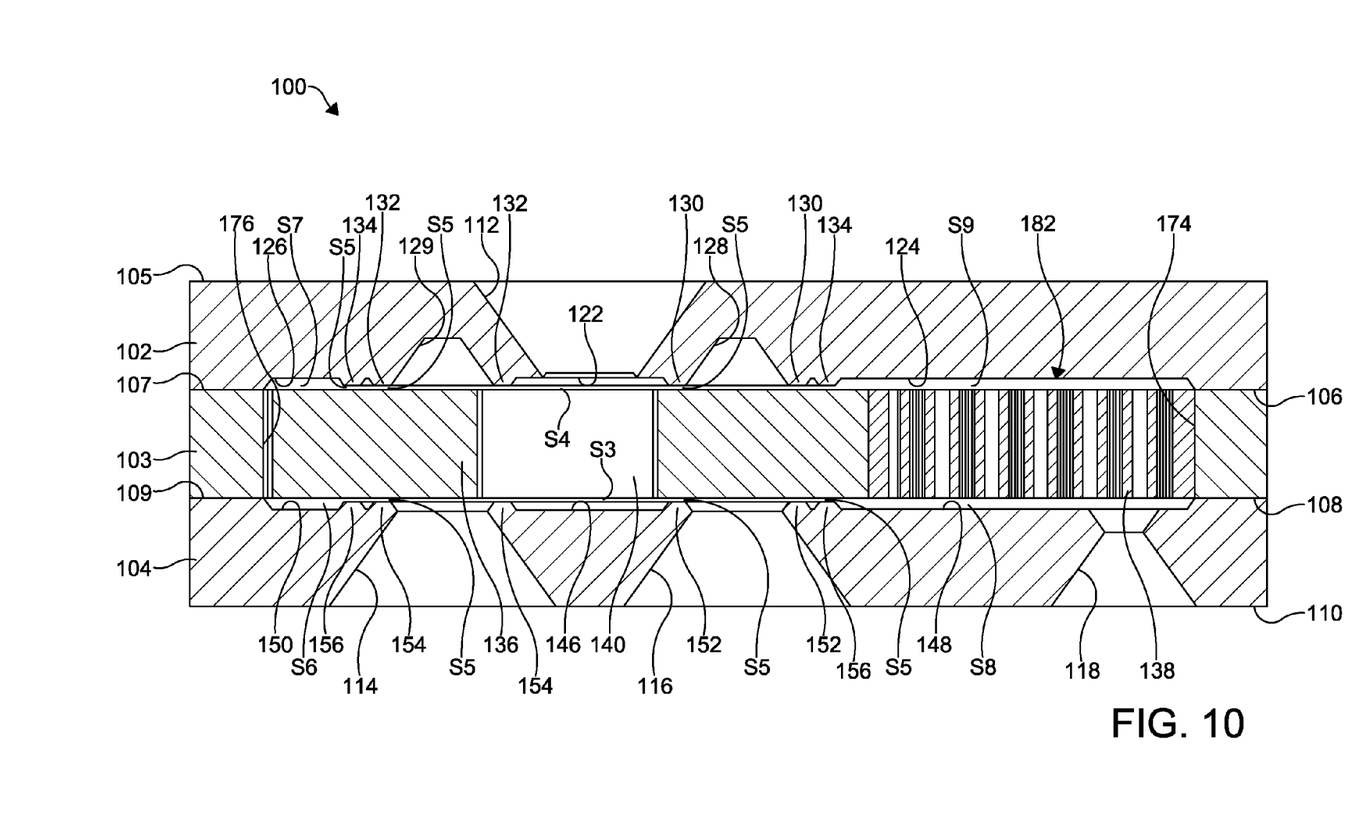
FIG. 10 is a first alternate sectional elevational view the microvalve illustrated in FIGS. 4 and 9 showing the intermediate plate in the second position.

When the microvalve 100 is assembled as shown in FIGS. 9 and 10, the inner surface 106 of the cover plate 102 engages the first surface 107 of a non-movable portion 171 of the intermediate plate 103, and the inner surface 109 of the base plate 104 engages the second surface 108 of the non-movable portion 171 of the intermediate plate 103. The cover plate 102, the intermediate plate 103, and the base plate 104 may be retained in this orientation in any desired manner. For example, portions of the cover plate 102 and/or the base plate 104 may be bonded to non-movable portions of the intermediate plate 103 by any of the methods described above for bonding the component plates of the microvalve 100. The cover plate 102, the intermediate plate 103, and the base plate 104 may be composed of any desired material or combination of materials, such as silicon, single crystal silicon, and/or similar materials.

Figure 8:
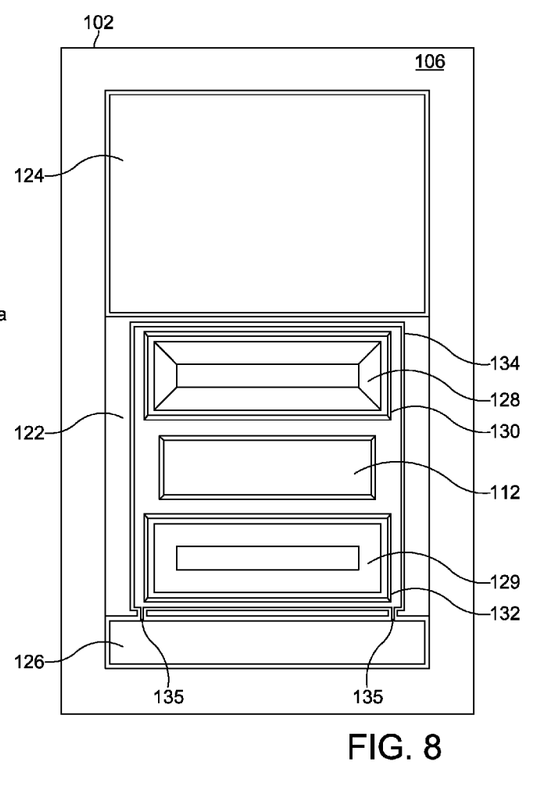
FIG. 8 is a plan view of an inner surface of the cover plate illustrated in FIG. 4.

The structure of the inner surface 106 of the cover plate 102 is illustrated in detail in FIG. 8. As shown therein, the cover plate 102 includes a first recessed region 122, a second recessed or control region 124, and a third recessed region 126 provided on the inner surface 106 thereof. The common port 112 is formed through the first recessed region 122. First and second pressure equalization troughs 128 and 129 are also formed the inner surface 106 within the first recessed region 122.

The cover plate 102 also includes a first sealing structure 130 that extends from the bottom surface of the first recessed region 122 and completely about the perimeter of the first pressure equalization trough 128, and a second sealing structure 132 that also extends from the bottom surface of the first recessed region 122 and completely about the perimeter of the second pressure equalization trough 129. A third sealing structure 134 extends from the bottom surface of the first recessed region 122 and completely about a perimeter of the first recessed region 122. Channels 135 are formed in the inner surface 106 of the cover plate 102 and through a portion of the third sealing structure 134. The channels 135 fluidly connect the first recessed region 122 and the third region 126 and define feedback ports. In the embodiment illustrated, two channels 135 are shown. Alternatively, any desired number of channels 135 may be provided, including one channel 135 and three or more channels 135.

In the illustrated embodiment, each of the sealing structures 130, 132, and 134 is a wall that is generally trapezoidal in cross-sectional shape and has a width W at its top of about 70 μm, as shown in FIG. 9. Alternatively, the width W may be within the range of from about 40 μm to 120 μm. Each of the sealing structures 130, 132, and 134 includes four linearly-extending wall segments that extend adjacent to the four sides of the first pressure equalization trough 128, the second pressure equalization trough 129, and the first recessed region 122, respectively. The sealing structures 130, 132, and 134 may however, be formed having any desired cross-sectional shape or combination of shapes, and may further extend in any desired manner (linearly or otherwise) about the first pressure equalization trough 128, the second pressure equalization trough 129, and the first recessed region 122. For example, the sealing structures 130, 132, and 134 may be formed substantially as shown in FIGS. 9 and 10, but may have rounded corners between adjacent linearly-extending wall segments, have one or more non-linearly-extending wall segments, or be entirely non-linear in shape.

Figure 6:
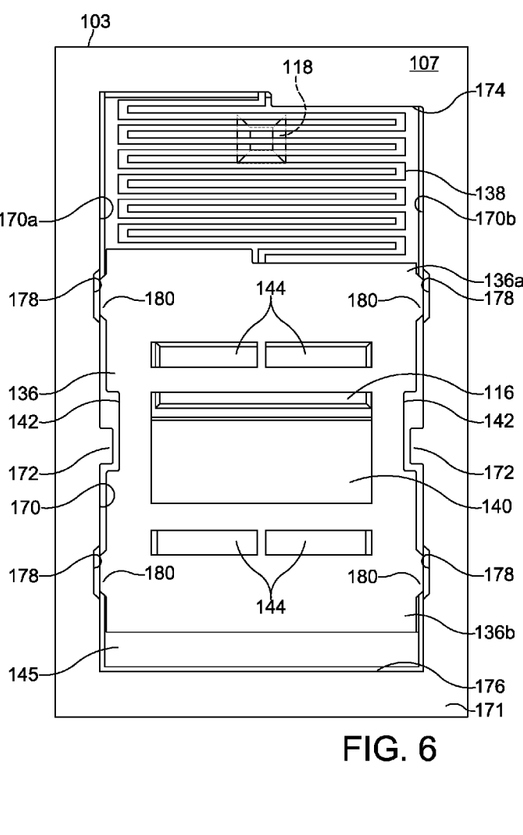
FIG. 6 is a plan view of a first surface of the intermediate plate illustrated in FIG. 4 showing the intermediate plate in a first position.
Figure 7:
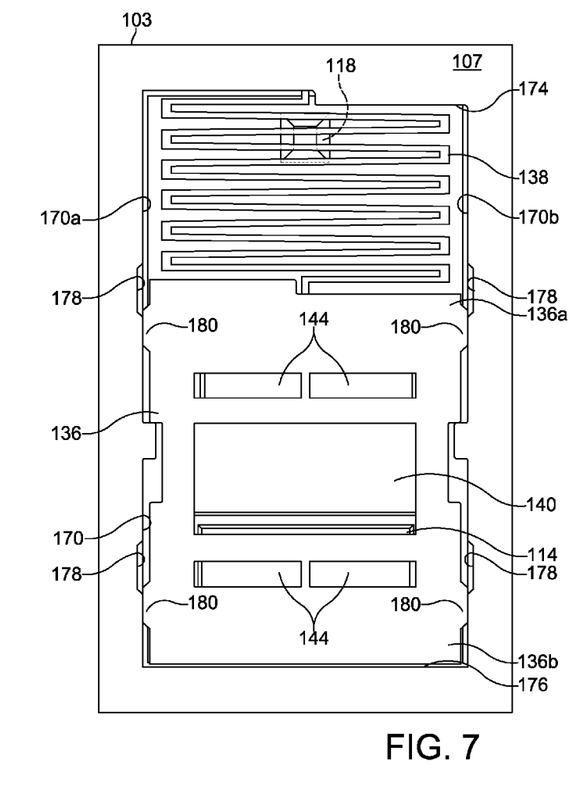
FIG. 7 is an alternate plan view of the first surface of the intermediate plate illustrated in FIGS. 4 and 6 showing the intermediate plate in a second position.

The structure of the intermediate plate 103 is illustrated in detail in FIGS. 4, 6, and 7. As shown therein, a wide and preferably rectangular plate opening 170 is formed in the intermediate plate 103.

The plate opening 170 has a first end 174 and a second end 176 opposite the first end 174. Each of the walls 170a and 170b of the plate opening 170 that extend between the first end 174 and the second end 176 has a plurality of outwardly extending recesses 178 formed therein, the purpose of which will be described below. A pair of inwardly extending tabs 172 are also formed in the walls 170a and 170b intermediate the first end 174 and the second end 176 of the plate opening 170.

The intermediate plate 103 further includes a moveable portion configured as a displaceable member or plate 136 disposed in the plate opening 170 between the first and second ends 174 and 176 of the plate opening 170. The displaceable plate 136 is generally rectangular with a first end 136a disposed nearest the first end 174 of the plate opening 170 and defining an axis A. The displaceable plate 136 has a second end 136b disposed nearest the second end 176 of the plate opening 170.

Figure 11:
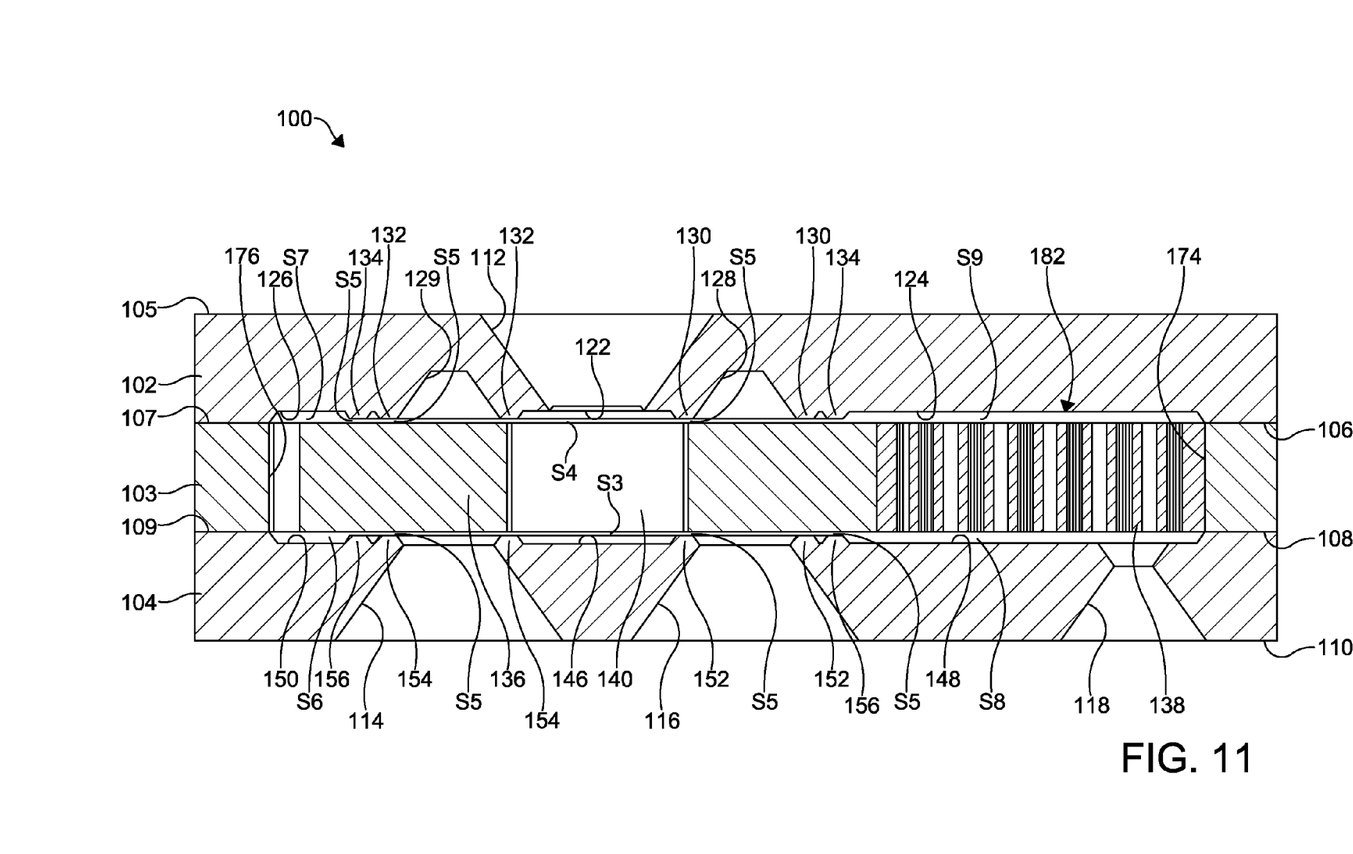
FIG. 11 is a second alternate sectional elevational view the microvalve illustrated in FIGS. 4, 9, and 10 showing the intermediate plate in a maintaining position.

The displaceable plate 136 is movable between a maintaining position, as shown in FIG. 11 and described in detail below, wherein the normally closed valve port 114 and the normally open valve port 116 are closed, a first position wherein the second end 136b is spaced apart from the second end 176 of the plate opening 170, as shown in FIGS. 6 and 9, and a second position wherein the second end 136b is adjacent the second end 176 of the plate opening 170, as best shown in FIGS. 7 and 10.

The displaceable plate 136 has a relatively large and centrally formed fluid flow opening 140 formed therethrough. Pressure balance ports 144 are also formed through the displaceable plate 136 adjacent the fluid flow opening 140.

The displaceable plate 136 further has a plurality of protrusions 180 defined on side walls thereof. Each of the protrusions 180 is aligned with a corresponding one of the recesses 178 formed in the walls of the plate opening 170 when the displaceable plate 136 is in the first position, as shown in FIG. 6. When the protrusions 180 are aligned with the recesses 178, a leak path between the protrusions 180 and the recesses 178 is minimized. The protrusions 180 are sufficiently shallow; i.e., have a minimal thickness, so as not to interfere with the travel of the displaceable plate 136 within the plate opening 170. However, when the displaceable plate 136 is out of the first position, the outwardly extending protrusions 180 on the displaceable plate 136 are no longer aligned with the corresponding outwardly extending recesses 178, and the protrusions 180 are closer and have a reduced clearance relative to the non-recessed portions of the walls of the plate opening 170.

A pair of notches 142 is also formed in the side walls of the displaceable plate 136 intermediate the first and second ends, 136a and 136b, respectively. Each of the notches 142 is aligned with a corresponding one of the tabs 172 formed in the walls 170a and 170b of the plate opening 170. The tabs 172 define stop surfaces that limit travel of the displaceable plate 136 between the first position and the second position.

The intermediate plate 103 also includes a convoluted spring 138, disposed in the plate opening 170. The convoluted spring 138 moveably connects the non-movable portion 171 of the intermediate plate 103 to the displaceable plate 136, and preferably biases the displaceable plate 136 to the first position. The convoluted spring 138 also retains the displaceable plate 136 in the plate opening 170, simplifying handling of the intermediate plate 103 during manufacture. A variable volume region 145 is defined between the displaceable plate 136 and the second end 176 of the plate opening 170 when the displaceable plate 136 is in the first position.

Figure 5:
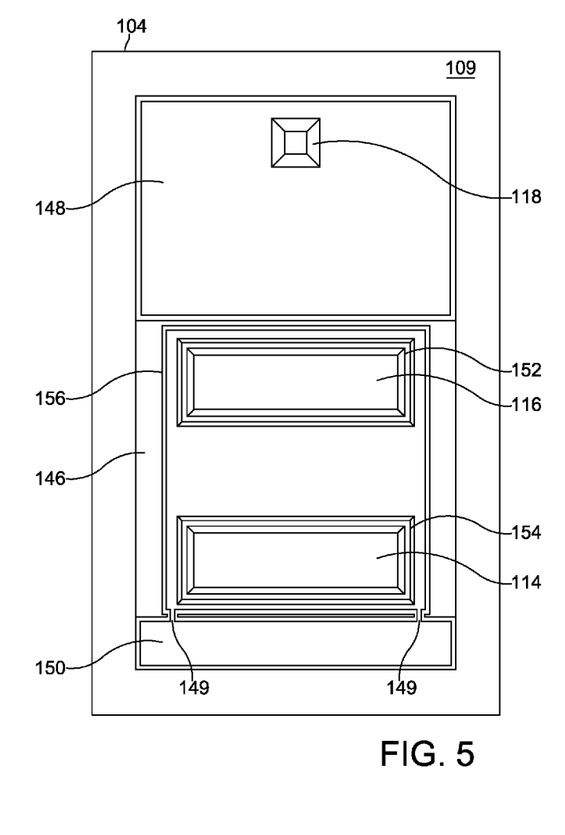
FIG. 5 is a plan view of an inner surface of the base plate illustrated in FIG. 4.

The structure of the inner surface 109 of the base plate 104 is illustrated in detail in FIG. 5. As shown therein, the base plate 104 includes a first recessed region 146, a second recessed or control region 148, and a third recessed region 150 provided on the inner surface 109 thereof. The normally closed valve port 114 and the normally open valve port 116 are formed through the first recessed region 146, and the control port 118 is formed and the second feedback port 116 is formed through the second recessed region 148. As described in below, the control regions 124 and 148 combine to define a control chamber 182.

The base plate 104 also includes a first sealing structure 152 that extends from the bottom surface of the first recessed region 146 and completely about the perimeter of the normally open valve port 116. A second sealing structure 154 also extends from the bottom surface of the first recessed region 146 and completely about a perimeter of the normally closed valve port 114. A third sealing structure 156 extends from the bottom surface of the first recessed region 146 and completely about the perimeter of the first recessed region 146. Channels 149 are formed in the inner surface 109 of the base plate 104 and through a portion of the third sealing structure 156. The channels 149 fluidly connect the first recessed region 146 and the third region 150 and define feedback ports. In the embodiment illustrated, two channels 149 are shown. Alternatively, any desired number of channels 149 may be provided, including one channel 149 and three or more channels 149.

In the illustrated embodiment, each of the sealing structures 152, 154, and 156 is a wall that is generally trapezoidal in cross-sectional shape and has the width W of about 70 μm at its top, as shown in FIG. 9. Alternatively, the width W may be within the range of from about 40 μm to 120 μm. Each of the sealing structures 152, 154, and 156 includes four linearly-extending wall segments that extend adjacent to the four sides of the normally open valve port 116, the normally closed valve port 114, and the first recessed region 146, respectively. The sealing structures 152, 154, and 156 may however, be formed having any desired cross-sectional shape or combination of shapes, and may further extend in any desired manner (linearly or otherwise) about the normally open valve port 116, the normally closed valve port 114, and the first recessed region 146. For example, the sealing structures 152, 154, and 156 may be formed substantially as shown in FIGS. 9 and 10, but may have rounded corners between adjacent linearly-extending wall segments, have one or more non-linearly-extending wall segments, or be entirely non-linear in shape.

A first space S3 is defined between bottom surfaces of the recessed region 146 of the base plate 104 and the second surface 108 of the displaceable plate 136 of the intermediate plate 103. A second space S4 is also defined between bottom surfaces of the recessed region 122 of the cover plate 102 and the first surface 107 of the displaceable plate 136 of the intermediate plate 103. The thickness of the first and second spaces S3 and S4 may be any desired value that is not likely to result in one or more particles (not shown) contained in fluid flowing through the first and second spaces S3 and S4 becoming jammed therein. For example, the thickness of the first and second spaces S3 and S4 may be approximately 50 μm.

Additionally, a relatively small third space S5 is defined between a top surface of the sealing structures 152, 154, and 156 of the base plate 104 and the second surface 108 of the displaceable plate 136 of the intermediate plate 103, and between a top surface of the sealing structures 130, 132, and 134 and the first surface 107 of the displaceable plate 136 of the intermediate plate 103. The thickness of the relatively small third space S5 may be any desired value that is not likely to result in excessive leakage as describe above. For example, the thickness of the relatively small third space S5 may be approximately 3 μm.

A fourth space S6 is defined between bottom surfaces of the recessed region 150 of the base plate 104 and the second surface 108 of the displaceable plate 136 of the intermediate plate 103. A fifth space S7 is defined between bottom surfaces of the recessed region 126 of the cover plate 102 and the first surface 107 of the displaceable plate 136 of the intermediate plate 103. A sixth space S8 is defined between bottom surfaces of the recessed region 148 of the base plate 104 and the second surface 108 of the displaceable plate 136 of the intermediate plate 103. A seventh space S9 is also defined between bottom surfaces of the recessed region 124 of the cover plate 102 and the first surface 107 of the displaceable plate 136 of the intermediate plate 103. The thickness of the fourth, fifth, sixth, and seventh spaces S6, S7, S8, and S9, respectively, may be any desired value that is not likely to result in one or more particles (not shown) contained in fluid flowing through the fourth, fifth, sixth, and seventh spaces S6, S7, S8, and S9 becoming jammed therein. In the illustrated embodiment, the fourth, fifth, sixth, and seventh spaces S6, S7, S8, and S9 have a thickness of approximately 50 μm.

The operation of the pilot operated plate microvalve 100 described herein is similar to the pilot operated plate microvalves disclosed in U.S. Pat. No. 8,113,482 to Hunnicutt. U.S. Pat. No. 8,113,482 to Hunnicutt, the disclosure of which is incorporated herein in its entirety by reference, describes the structure and operation of a plurality of embodiments of known pilot operated pressure control plate microvalves.

During use, the microvalve 100 may be operated in a conventional manner (or otherwise) to selectively move the displaceable plate 136 from the maintaining position (illustrated in FIG. 11) to either the first position (illustrated in FIG. 6), wherein the normally closed valve port 114 is closed and the normally open valve port 116 is at least partially open, and the second position (illustrated in FIG. 7), wherein the normally closed valve port 114 is at least partially open and the normally open valve port 116 is closed. When the displaceable plate 136 is located in the first position, it is desirable that as little fluid as possible flows through the normally closed valve port 114. Likewise, when the displaceable plate 136 is located in the second position, it is desirable that as little fluid as possible flows through the normally open valve port 116. Similarly, when the displaceable plate 136 is in the maintaining position, it is desirable that as little fluid as possible flows through the normally closed valve port 114 and the normally open valve port 116. This is accomplished by providing the first sealing structure 152 that extends from the bottom surface of the first recessed region 146 and completely about the perimeter of the normally open valve port 116, the second sealing structure 154 that extends from the bottom surface of the first recessed region 146 and completely about the perimeter of the normally closed valve port 114, the first sealing structure 130 that extends from the bottom surface of the first recessed region 122 and completely about the perimeter of the first pressure equalization trough 128, and the second sealing structure 132 that also extends from the bottom surface of the first recessed region 122 and completely about the perimeter of the second pressure equalization trough 129.

At the same time, the geometry of the microvalve 100 resists interference with the free movement of the displaceable plate 136 of the microvalve 100 that might otherwise result from the presence of particulate contaminants contained in the fluid flowing therethrough. This is accomplished by providing (1) the first space S3 between the first recessed region 146 provided on the base plate 104 and the adjacent second surface 108 (the lower surface when viewing FIGS. 9 and 10) of the displaceable plate 136, and (2) the second space S4 between the first recessed region 122 provided on the cover plate 102 and the adjacent first surface 107 (the upper surface when viewing FIGS. 9 and 10) of the displaceable plate 136. The relatively large thicknesses of the first and second spaces S3 and S4 is selected so as to prevent one or more particles (not shown) contained in the fluid moving through the microvalve 100 from becoming jammed therebetween, or at least to minimize the number of such particles that may become jammed therebetween.

The illustrated microvalve 100 is a pressure control three-port plate microvalve and may be actuated by a pilot valve, schematically illustrated at 160. The pilot valve may be any desired valve that supplies a command pressure to the control port 118, such as a microvalve or a standard-sized pilot valve.

In a typical application, the normally closed valve port 114 is connected to a source of pressurized fluid 162, such as a pump, an accumulator, or any other device that provides pressurized fluid. The common port 112 is a load port configured to supply fluid to a load 166, such as a transmission clutch or brake, and other hydraulic actuators. The normally open valve port 116 may be connected to a destination device 164, such as a fluid reservoir, a pump suction port, or a fluid accumulator.

In FIG. 11, the microvalve 100 is shown in a maintaining position wherein fluid pressure in the variable volume region 145 is substantially equal to the fluid pressure in the control chamber 182 plus the spring force of the convoluted spring 138. In the maintaining position, the fluid flow opening 140 in the displaceable plate 136 is positioned between the normally closed valve port 114 and the normally open valve port 116, therefore causing the normally closed valve port 114 and the normally open valve port 116 to both be closed.

By supplying relatively high pressure fluid (compared to the pressure of fluid in the variable volume region 145) into the control port 118 pressure in the control chamber 182 will urge the displaceable plate 136 into the second position, stretching the spring 138 as shown in FIG. 10, until the command pressure in the control chamber 182 reaches a supply pressure at the normally closed valve port 114.

When the fluid pressure at the control port 118 is reduced such that fluid pressure in the variable volume region 145 approaches the fluid pressure in the control chamber 182, the fluid pressure forces acting longitudinally on the displaceable plate 136 will begin to cancel out, and the displaceable plate 136 will move to the first position, as shown in FIGS. 4, 6, and 9.

In addition to the advantages provided by the sealing structures 130, 132, 134, 152, 154, and 156, the pressure balance ports 144 are formed through the displaceable plate 136 adjacent the fluid flow opening 140. This structure eliminates the need for elongated pressure balance trenches, such as the elongated pressure balance trenches 47 and 57 in the known microvalve 10. Further, the combination of the sealing structures 130, 132, 134, 152, 154, and 156 and the elimination of the elongated pressure balance trenches 47 and 57 allows the plates 102, 103, and 104 of the improved microvalve 100 to be smaller than the corresponding plates 12, 14, and 16 of the known microvalve 10. The reduced size of the component plates 102, 103, and 104 also results in reduced contact surface area between the stationary plates 102 and 104 and the movable plate 103, further simplifying manufacture, and reducing cost of the microvalve 10. Further, because the microvalve 100 does not include the elongated pressure balance trenches 47 and 57 of the known microvalve 10, the number of steps necessary to produce the microvalve 100 may be reduced relative to the known microvalve 10, thereby further contributing to a reduction in cost of the microvalve 100.

The embodiment of the plate microvalve 100 of this invention illustrated in FIGS. 4 through 11 includes the common port 112 formed in the cover plate 102. It will be understood however, that the improved sealing structures of this invention may be applied to a plate microvalve wherein the common port 112 is formed in the port or base plate 104.

The principle and mode of operation of the microvalve have been described in its preferred embodiments. However, it should be noted that the microvalve described herein may be practiced otherwise than as specifically illustrated and described without departing from its scope.

What is claimed is:

1. A microvalve comprising:
a first plate including an inner surface, a recessed region provided within the inner surface, a normally open fluid port and a normally closed fluid port provided within the recessed region, a first sealing structure extending from a bottom surface of the recessed region and about the normally open fluid port, and a second sealing structure extending from the bottom surface of the recessed region and about the normally closed fluid port, wherein a portion of the recessed region extends between the first sealing structure and the second sealing structure; and
a second plate defining a non-movable portion and a movable portion, a surface of the non-movable portion abutting the inner surface of the first plate, the non-movable portion having an opening formed therethrough, the movable portion formed within the opening and having an axis, the movable portion defining a displaceable member connected to the non-movable portion by a convoluted spring formed in the opening, the displaceable member slidingly and axially movable within the opening between a first position, wherein the displaceable member substantially blocks the normally closed fluid port, and a second position, wherein the displaceable member does not substantially block the normally closed fluid port.

2. The microvalve according to claim 1, wherein the microvalve is a pressure control plate microvalve.

3. The microvalve according to claim 1, wherein the microvalve is a pilot operated pressure control plate microvalve.

4. The microvalve according to claim 1, wherein in the first position, the displaceable member does not substantially block the normally open fluid port, and wherein in the second position the displaceable member substantially blocks the normally open fluid port.

5. The microvalve according to claim 1, wherein a first space having a first thickness is defined between a surface of the displaceable member and a surface of the recessed region of the first plate and a second space having a second thickness is defined between the surface of the displaceable member and surfaces of the first and second sealing structures of the first plate, wherein the surface of the displaceable member is parallel to the surface of the recessed region and parallel to the surfaces of the first and second sealing structures, and wherein the first thickness is greater than the second thickness.

6. The microvalve according to claim 1, wherein the second plate defines a plane, and wherein the displaceable member moves parallel to the plane when moved between the closed and opened positions.

7. The microvalve according to claim 1, wherein the displaceable member is configured as a plate having a fluid flow opening formed therethrough.

8. The microvalve according to claim 1, wherein the recessed region is a first recessed region, the normally open fluid port and the normally closed fluid port are provided in the first recessed region, and the first plate further includes a second recessed region.

9. The microvalve according to claim 8, further including a third sealing structure extending from a bottom surface of the first recessed region about a perimeter of the first recessed region and about both the normally open fluid port and the normally closed fluid port, wherein a portion of the recessed region extends between the third sealing structure and the first sealing structure and between the third sealing structure and the second sealing structure.

10. The microvalve according to claim 8, further including a control port provided within the second recessed region.

11. A microvalve comprising:
a base plate including an inner surface, a base plate recessed region provided within the inner surface, a normally open fluid port and a normally closed fluid port provided within the base plate recessed region, a first sealing structure extending from a bottom surface of the base plate recessed region and about the normally open fluid port, and a second sealing structure extending from the bottom surface of the base plate recessed region and about the normally closed fluid port, wherein a portion of the base plate recessed region extends between the first sealing structure and the second sealing structure;
a cover plate including an inner surface, a cover plate recessed region provided within the inner surface, first and second pressure equalization troughs provided within the cover plate recessed region, a third sealing structure extending from the bottom surface of the cover plate recessed region and about the first pressure equalization trough, and a fourth sealing structure extending from the bottom surface of the cover plate recessed region and about the second pressure equalization trough; and
an intermediate plate defining a non-movable portion and a movable portion, a first surface of the non-movable portion abutting the inner surface of the base plate and a second surface of the non-movable portion abutting the inner surface of the cover plate, the non-movable portion having an opening formed therethrough, the movable portion formed within the first opening and having an axis, the movable portion defining a displaceable member connected to the non-movable portion by a convoluted spring formed in the opening, the displaceable member slidingly and axially movable within the opening between a first position, wherein the displaceable member substantially blocks the normally closed fluid port, and a second position, wherein the displaceable member does not substantially block the normally closed fluid port.

12. The microvalve according to claim 11, wherein in the first position, the displaceable member does not substantially block the normally open fluid port, and wherein in the second position the displaceable member substantially blocks the normally open fluid port.

13. The microvalve according to claim 11, wherein a first space having a first thickness is defined between a surface of the displaceable member and a surface of the recessed regions of the base plate and the cover plate, and a second space having a second thickness is defined between the surface of the displaceable member and surfaces of the first, second, third, and fourth sealing structures, wherein the surface of the displaceable member is parallel to the surface of the recessed region and parallel to the surfaces of the first, second, third, and fourth sealing structures, and wherein the first thickness is greater than the second thickness.

14. The microvalve according to claim 11, wherein the intermediate plate defines a plane, and wherein the displaceable member moves parallel to the plane when moved between the first and second positions.

15. The microvalve according to claim 11, wherein the displaceable member is configured as a plate having a fluid flow opening formed therethrough.

16. The microvalve according to claim 11, wherein the base plate recessed region is a first base plate recessed region, the normally open fluid port and the normally closed fluid port are provided in the first base plate recessed region, and the base plate further includes a second base plate recessed region.

17. The microvalve according to claim 16, further including a third sealing structure extending from a bottom surface of the first base plate recessed region about a perimeter of the first base plate recessed region, and about both the normally open fluid port and the normally closed fluid port, wherein a portion of the base plate recessed region extends between the third sealing structure and the first sealing structure and between the third sealing structure and the second sealing structure.

18. The microvalve according to claim 16, further including a control port provided within the second recessed region of the base plate.

19. The microvalve according to claim 11, wherein the microvalve is a pressure control plate microvalve.

20. The microvalve according to claim 11, wherein the microvalve is a pilot operated pressure control plate microvalve.

* * * * *